(12) United States Patent
Narasimhamurthy

(10) Patent No.: US 9,667,754 B2
(45) Date of Patent: May 30, 2017

(54) DATA STRUCTURE AND ASSOCIATED MANAGEMENT ROUTINES FOR TCP CONTROL BLOCK (TCB) TABLE IN NETWORK STACKS

(71) Applicant: Oracle International Corporation, Redwood Shores, CA (US)

(72) Inventor: Giridhar Narasimhamurthy, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 348 days.

(21) Appl. No.: 14/456,924

(22) Filed: Aug. 11, 2014

(65) Prior Publication Data

US 2016/0044143 A1 Feb. 11, 2016

(51) Int. Cl.
*G06F 15/173* (2006.01)
*H04L 12/28* (2006.01)
*H04L 29/06* (2006.01)

(52) U.S. Cl.
CPC ................... *H04L 69/16* (2013.01)

(58) Field of Classification Search
CPC ... H04L 45/00; H04L 29/06; H04L 29/08072; H04L 29/08144; H04L 29/12009; H04L 43/50; H04L 12/2697; H04L 43/00; H04L 12/2602; H04J 3/14
USPC ........................................................ 709/238
See application file for complete search history.

(56) References Cited

U.S. PATENT DOCUMENTS

| 2005/0286430 A1* | 12/2005 | Koga ..................... H04L 12/462 370/241 |
| 2006/0161642 A1* | 7/2006 | Bopardikar ............. G06F 3/061 709/219 |
| 2008/0095153 A1* | 4/2008 | Fukunaga ............. H04L 43/028 370/389 |
| 2011/0153954 A1* | 6/2011 | Seki ...................... G06F 12/084 711/141 |

(Continued)

OTHER PUBLICATIONS

Liao, G., Bhuyan, L., Wu, W., Yu, H., King, S., "A New TCB Cache to Efficiently Manage TCP Sessions for Web Servers", ANCS '10, Oct. 25-26, 2010, 10 pages.

(Continued)

*Primary Examiner* — Mahran Abu Roumi
(74) *Attorney, Agent, or Firm* — Osha Liang LLP

(57) ABSTRACT

A method for transport layer lookup involves receiving a first incoming transport layer packet, and searching a pointer cache for a first matching transport layer data structure including state information corresponding to the first incoming packet. The pointer cache includes pointer cache lines, each of which stores at least one pointer to a subset of global transport layer data structures. The method further involves returning the state information corresponding to the first incoming packet using the first matching transport layer data structure when a pointer cache hit occurs, receiving a second incoming transport layer packet, searching the pointer cache for a second matching transport layer data structure including state information corresponding to the second incoming packet, and searching the plurality of global transport layer data structures in main memory to obtain the matching second transport layer data structure, when a pointer cache miss occurs.

10 Claims, 8 Drawing Sheets

(56) References Cited

U.S. PATENT DOCUMENTS

| | | | | |
|---|---|---|---|---|
| 2011/0179075 A1* | 7/2011 | Kikuchi | ............ | G06F 17/30011 |
| | | | | 707/769 |
| 2011/0320632 A1* | 12/2011 | Karino | .................. | H04L 45/586 |
| | | | | 709/238 |
| 2014/0181459 A1* | 6/2014 | Venkumahanti | .... | G06F 12/1027 |
| | | | | 711/207 |
| 2014/0301388 A1* | 10/2014 | Jagadish | ............. | H04L 67/2814 |
| | | | | 370/389 |

OTHER PUBLICATIONS

Clark, D., Jacobson, V., Romkey, J., Salwen, H., "An Analysis of TCP Processing Overhead", IEEE Communications Magazine, Jun. 1989, 7 pages.

Oppermann, A., "Optimizing the FreeBSD IP and TCP Stack", The FreeBSD Project, Nov. 27, 2005, 15 pages.

Touch, J., "TCP Control Black Interdependence", Network Working Group, Apr. 1997, 11 pages.

\* cited by examiner

DATA STRUCTURE AND ASSOCIATED MANAGEMENT ROUTINES FOR TCP CONTROL BLOCK (TCB) TABLE IN NETWORK STACKS

BACKGROUND

Look-up/search operations are the most prolific operations performed by any information processing software system. In such systems, data is created and stored in data structures such as trees, linked lists, and hash tables. Several threads of execution access the information by performing look-up/search operations, and the performance of information retrieval software is dependent on the efficiency of these look-up/search operations.

SUMMARY

In general, in one aspect, the invention relates to a method for transport layer lookup, comprising receiving, by the transport layer of a network protocol stack, a first incoming transport layer packet, searching a pointer cache for a first matching transport layer data structure comprising state information corresponding to the first incoming packet, wherein the pointer cache comprises a plurality of pointer cache lines, each of which is configured to store at least one pointer to a subset of a plurality of global transport layer data structures, returning the state information corresponding to the first incoming packet using the first matching transport layer data structure when a pointer cache hit occurs for the state information corresponding to the first incoming packet, receiving, by the transport layer of a network protocol stack, a second incoming transport layer packet, searching the pointer cache for a second matching transport layer data structure comprising state information corresponding to the second incoming packet, and searching the plurality of global transport layer data structures in main memory to obtain the matching second transport layer data structure, and storing a pointer to a memory address of the matching second transport layer data structure in the pointer cache, when a pointer cache miss occurs for the state information corresponding to the second incoming packet.

In general, in one aspect, the invention relates to a host comprising a network protocol stack comprising a transport layer configured to receive a first incoming packet and a second incoming packet, and main memory configured to store a plurality of global transport layer data structures, wherein the plurality of global transport layer data structures is configured to store state information for a plurality of incoming packets, and a pointer cache comprising a plurality of pointer cache lines, each of which is configured to store at least one pointer to a subset of the plurality of global transport layer data structures, wherein the transport layer is further configured to search the pointer cache for a matching first transport layer data structure comprising state information corresponding to the first incoming packet, return the state information corresponding to the first incoming packet using the first matching transport layer data structure when a pointer cache hit occurs for the state information corresponding to the first incoming packet, search the pointer cache for a second matching transport layer data structure comprising state information corresponding to the second incoming packet, and searching the plurality of global transport layer data structures in the main memory to obtain the matching second transport layer data structure, and store a pointer to a memory address of the matching second transport layer data structure in the pointer cache, when a pointer cache miss occurs for the state information corresponding to the second incoming packet.

In general, in one aspect, the invention relates to a non-transitory computer readable medium comprising software instructions that when executed, perform a method for transport layer lookup, comprising receiving, by the transport layer of a network protocol stack, a first incoming transport layer packet, searching a pointer cache for a first matching transport layer data structure comprising state information corresponding to the first incoming packet, wherein the pointer cache comprises a plurality of pointer cache lines, each of which is configured to store at least one pointer to a memory address of a subset of a plurality of global transport layer data structures, returning the state information corresponding to the first incoming packet using the first matching transport layer data structure when a pointer cache hit occurs for the state information corresponding to the first incoming packet, receiving, by the transport layer of a network protocol stack, a second incoming transport layer packet, searching the pointer cache for a second matching transport layer data structure comprising state information corresponding to the second incoming packet, and searching the plurality of global transport layer data structures in main memory to obtain the matching second transport layer data structure, and storing a pointer to the memory address of the matching second transport layer data structure in the pointer cache, when a pointer cache miss occurs for the state information corresponding to the second incoming packet.

Other aspects of the invention will be apparent from the following description and the appended claims.

DETAILED DESCRIPTION

Figure 1A:
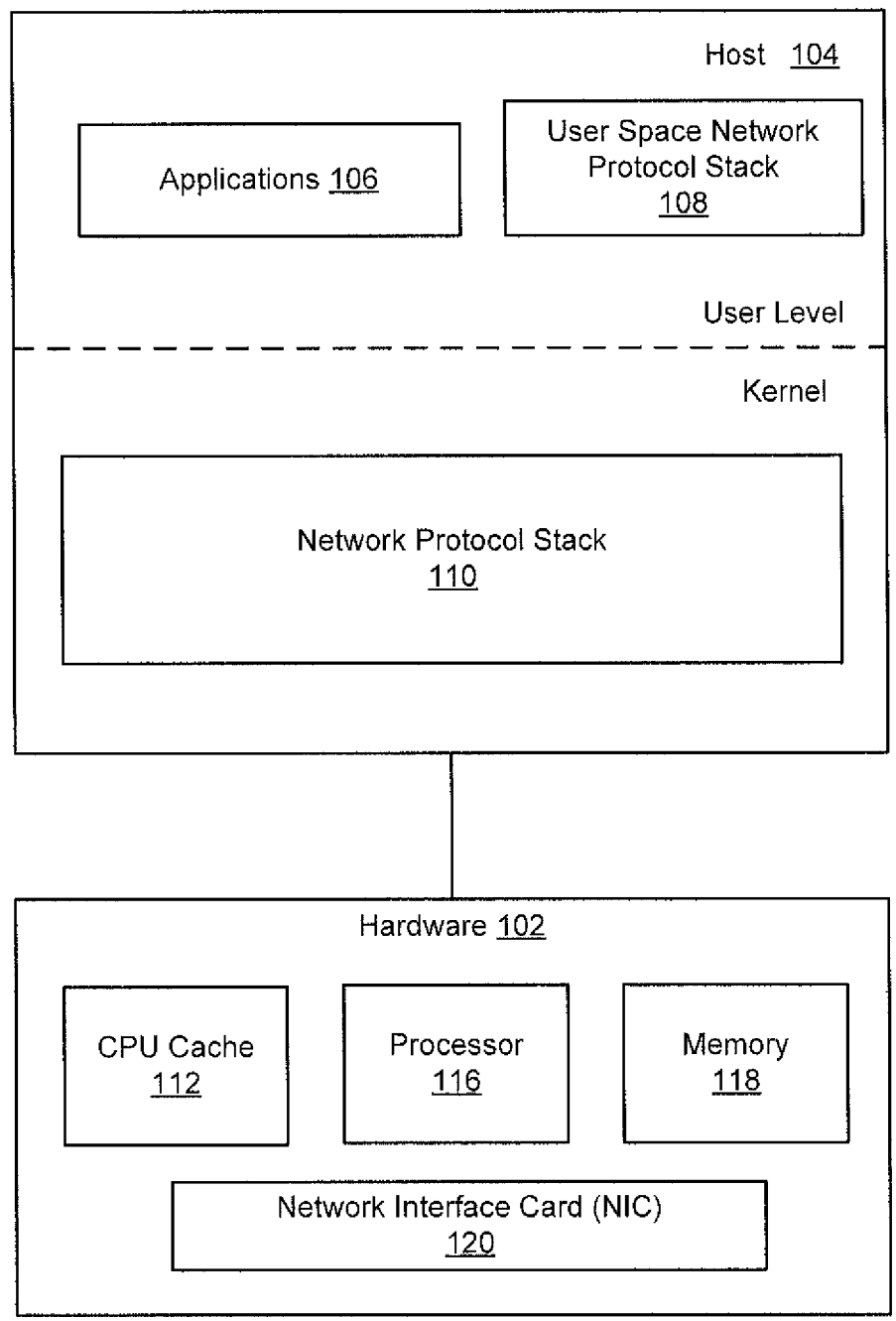
FIG. 1A shows a schematic diagram in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for efficient search/look-up within the transport control protocol (TCP) layer of a network protocol stack. More specifically, embodiments of the invention provide a cache of TCP control block (TCB) pointers which can be related to the overall TCBs present in a system. Such a data structure cache (TCB pointer cache) of a main data structure (TCBs) may be used to reduce penalties of regular look-ups.

Figure 1B:
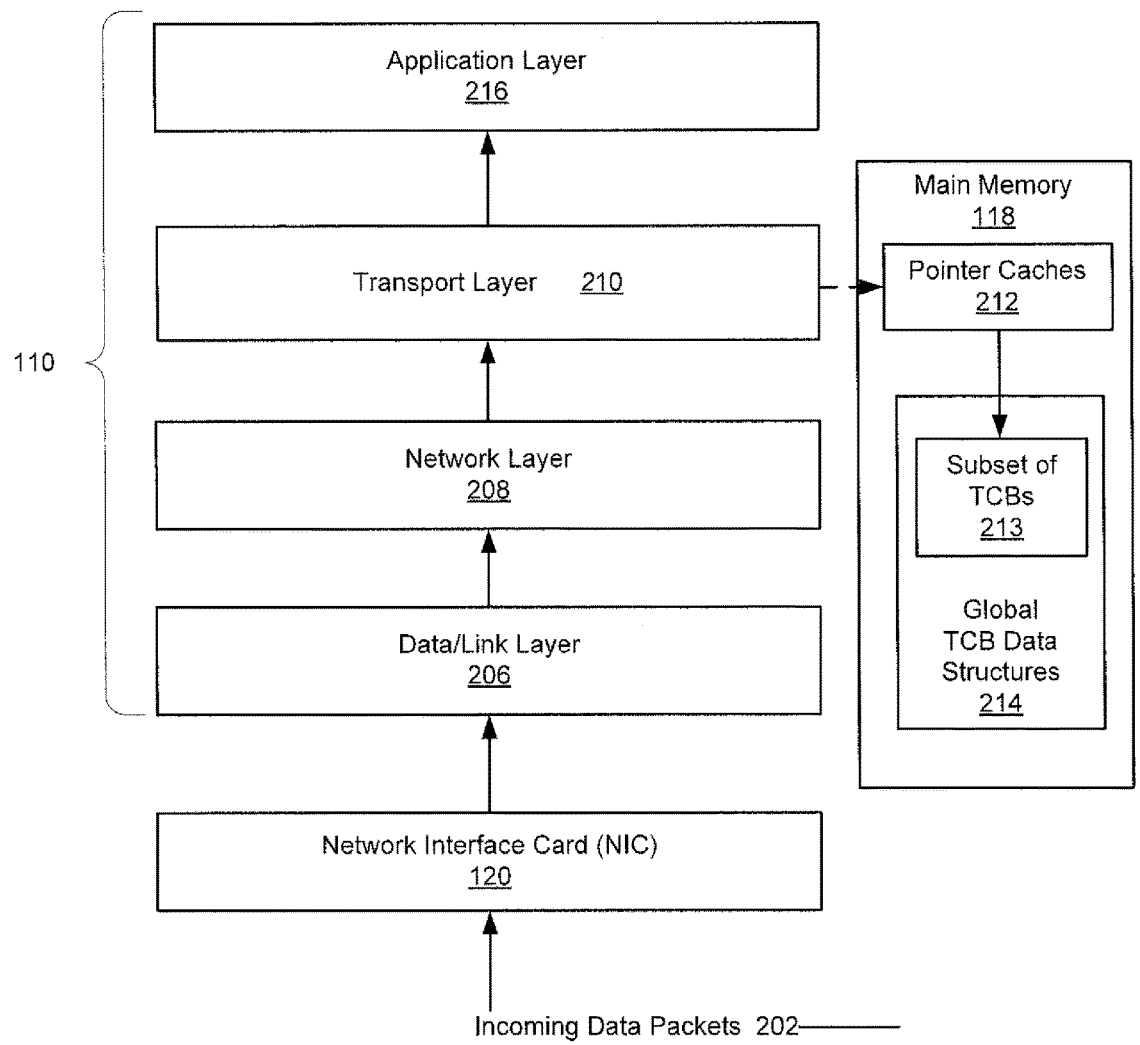
FIG. 1B shows a schematic diagram of a network protocol stack in accordance with one or more embodiments of the invention.

FIG. 1A-1B show schematic diagrams in accordance with one or more embodiments of the invention. Specifically, FIG. 1A shows the architecture of a host system in accordance with one or more embodiments of the invention. In one or more embodiments of the invention, the host (104) may be any computing system or device including, but not limited to: a server, a cluster, a thin client, a desktop computer, a laptop, a tablet, a handheld gaming device, a smartphone, etc. The host (104) executes an operating system (OS) (not shown) which includes a kernel (122) level and a user level (124).

The kernel (122) is a software layer that manages user level (124) applications (106) in the user level application layer (see 216 in FIG. 1B)). The kernel (122) includes the main components of the OS. Specifically, the kernel (122) includes, for example, the network protocol stack (110) (described further in FIG. 1B). These components enable applications (106) executing in the user-level (124) to interact with the hardware (102) of the host (104) system. Specifically, the kernel (122) manages the user level application's (106) use of the computer system's hardware (102). Thus, the kernel (122) determines when and whether a user-level application (106) may access a hardware resource in the hardware (102) of the host (104). The separation of the hardware layer (102) and the user-level (124) application layer allows for stability and security in the computer system and for the user-level application (106) to operate without requiring knowledge of the underlying hardware configuration which may include a processor (CPU) (116), memory (118), an on-chip CPU Cache (112) operatively connected to the processor (116), and a network interface card (NIC) (120). (See FIG. 1B).

In one or more embodiments of the invention, the user level (124) may include a user space network protocol stack (108). The user space network protocol stack (108) includes functionality similar to the network protocol stack (110) in the kernel (122), but is more customizable in the user space. That is, the user space network protocol stack (108) may also include, for example, a transport layer implementing TCP, but operates without being tied to the underlying native OS version, thereby allowing virtual applications to be native OS independent. For example, in the cloud/network functions virtualization computing environments, the user space stack (108) enables several features to be implemented, such as on-demand/dynamic provisioning of virtual network appliances and migration.

Those skilled in the art will appreciate that FIG. 1A may depict an architecture that may be implemented in a virtual machine (VM) in a virtualized system, or within a non-virtualized system. In a virtualized system, FIG. 1A may depict a guest operating system (OS) with a kernel network stack and a user space network stack. In a non-virtualized system, the architecture of FIG. 1A would include the native OS with its kernel network stack and a user space network stack.

FIG. 1B shows a schematic diagram of the network protocol stack (110) of FIG. 1A in further detail, in accordance with one or more embodiments of the invention. In one embodiment of the invention, the network stack (110) includes at least the following layers: an application layer (216), a transport layer (210), a network layer (208), and a Data/Link layer (206).

In one embodiment of the invention, the network stack (110) corresponds to a software implementation of a computer networking protocol suite. In other words, the network stack (110) includes mechanisms in software for allowing communication between computer systems (e.g., between a system on which the application is executing and a system on which the packet destination is located). In one or more embodiments of the invention, computer systems are able to communicate with one another using packets sent across one or more networks, which include local area networks (LANs), wide area networks (WANs), campus area networks (CANs), metropolitan area networks (MANS), home area networks (HANs), ad hoc networks, wireless networks, or any combination thereof. Each network is also associated with one or more protocols, which dictate how data is transferred between the computer systems.

In one or more embodiments of the invention, each layer (e.g., application layer (216), transport layer (210), network layer (208), data/link layer (206)) of the network stack (100) is associated with one or more protocols to facilitate the transmission of information between the network stack (110) and the packet destination over the network. In one or more embodiments of the invention, a packet destination refers to a computer, or an application executing thereon, operatively connected to network stack (110) via one or more networks. In one or more embodiments of the invention, each protocol in the network stack (110) performs tasks for a specific layer of the network stack (110) and communicates with protocols in the layer above and the layer below. For example, a protocol in the network layer (208) may communicate with one or more protocols in the data/link layer (206), as well as one or more protocols in the transport layer (210). In one or more embodiments of the invention, the network stack (110) is implemented using a set of protocols found in the Internet Protocol (IP) suite.

Within the network stack (110), the data/link layer (206), in one embodiment of the invention, regulates the transmission of bits over one or more networks between the network stack (110) and the packet destination. The bits may be transmitted over a variety of transmission media, including optical fiber, twisted pair cables, coaxial cables, and wireless antennae. In one or more embodiments of the invention, the data/link layer (206) provides an electrical, mechanical, and/or procedural interface to the transmission media used by the network(s). In one or more embodiments of the invention, the data/link layer (206) is also associated with data link capability, which provides data transfer across a physical transmission medium. The data/link layer (206) supports one or more protocols including, but not limited to, Asynchronous Transfer Mode (ATM), Ethernet, Bluetooth®, Universal Serial Bus (USB), FireWire® (FireWire is a registered trademark of Apple Computer, Inc. of Cupertino, Calif., U.S.A.), and Wi-Fi.

The network layer (208) is responsible for end-to-end transmission of data between the network stack (208) and a packet destination. In one or more embodiments of the invention, the network layer (208) provides functional and procedural mechanisms for transferring variable-length data sequences from the network stack (110) to a packet destination via one or more networks. In one or more embodiments of the invention, the network layer (208) performs network routing, flow control, network segmentation and desegmentation, and/or error control functions. Protocols associated with the network layer (208) may include, but are not limited to, Internet Protocol (IP), Address Resolution Protocol (ARP), and Datagram Delivery Protocol (DDP).

In one embodiment of the invention, the transport layer (210) provides transparent transfer of data between the network stack (110) and a packet destination. The transport layer (210) may also be responsible for end-to-end error recovery, flow control, and ensuring complete and cost-effective data transfer. Services provided by the transport layer (210) may include creating a connection between the network stack (110) and a packet destination, guaranteeing same order delivery of packets, providing a checksum of packet contents, regulating packet flow between the network stack (110) and packet destination, and providing multiple ports on the network stack (110). In one or more embodiments of the invention, ports are used to distinguish between network traffic bound for various networking applications in the application layer (216). Protocols associated with the transport layer may include, but are not limited to, Transmission Control Protocol (TCP), User Datagram Protocol (UDP), Datagram Congestion Control Protocol (DCCP), and Stream Control Transmission Protocol (SCTP). In one embodiment of the invention, the transport layer must be capable of handling many connections simultaneously. Each connection is uniquely identified and mapped to state information (also known as a context). For this purpose, in the TCP layer software of network protocol stacks, TCP Control Blocks (TCBs) are used to store the state information for each connection, and when a TCB segment is received by the transport layer, the first 12 to 36 Bytes of the segment which includes the four-tuple (quadruple) of the socket identifiers (IP address and port number) for each of the two devices on the connection, is used to find a four-tuple match stored in a TCB for each arriving TCP segment. There may be several hundred thousand to millions of TCP segments (and individual connections) received by a particular network stack. In this case, the number of TCBs having the state information of each segment may also be on the order of several hundred thousand TCBs. Traversal of the TCBs to find each match creates a large number of memory accesses, and the performance of these search operations determines the performance of TCP applications.

In one or more embodiments of the invention, the transport layer (210) is configured to access and/or is associated with one or more pointer caches (212) in main memory (118) configured to store an array of transmission control block (TCB) pointers in order to "cache" the most recently accessed TCBs (subset of TCBs (213)). As described above, in TCP layer software of network protocol stacks, connection tables or TCB tables are searched for a four-tuple match on each arriving TCP segment. Because each TCP connection is distinct, with a distinct source and destination for the incoming TCP packet, the transport layer (210) of the network protocol stack (110) maintains data about each connection separately in a data structure for this purpose known as the TCB (global TCB data structures 214 in main memory (118)). Each TCB (214) in main memory (118) is in a dynamic data structure such as a hash table, a linked list, a binary tree, an AVL (Adelson-Velskii and Landis') tree, or in any other suitable data structure. The TCB includes information about the connection, such as the two socket numbers that identify it and pointers to buffers where incoming and outgoing data are held. The TCB may also hold variables that keep track of the number of bytes received and acknowledged, bytes received and not yet acknowledged, current window size, etc. In one or more embodiments of the invention, each of the plurality of pointer caches (212) is a software-implemented cache that stores a subset of the total possible number of TCB pointers, and allows this smaller subset of pointers to be searched to determine which TCB includes the connection information for a packet that is received by the transport layer (210). Accordingly, each pointer cache (212) references a subset of the total global TCBs (214) that may be stored in main memory, where the subset of TCBs (213) referenced by the pointer caches (212) are the most recently accessed or the most frequently accessed TCBs. Operation of the pointer cache is described in further detail in FIGS. 2 and 3.

Those skilled in the art will appreciate that while embodiments of the invention discuss the transport layer protocol being the TCP, embodiments of the invention are equally applicable to other protocols utilized by the transport layer, such as UDP.

Continuing with FIG. 1B, the application layer (216) provides services directly to applications (106 in FIG. 1) in the application layer (216). For example, the application layer (216) is used by an application associated with the network stack (110) to communicate with an application associated with a packet destination. The application layer (216) may also be used to format data received from the transport layer (210) into a form that is usable by an application. In one or more embodiments of the invention, the application layer (216) provides encryption of data before the data is sent through the network to a packet destination. Protocols associated with the application layer may include, but are not limited to, HyperText Transfer Protocol (HTTP), File Transfer Protocol (FTP), Lightweight Directory Access Protocol (LDAP), and Simple Network Management Protocol (SNMP). In one or more embodiments of the invention, the application layer (216) includes one or more applications that communicate with one or more packet destinations via one or more networks.

In one embodiment of the invention, the data/link layer (206) is operatively connected to a network interface card (NIC) (120). In one embodiment of the invention, the NIC (120) is a hardware device that provides network access to a computer system. Specifically, the NIC (120) includes a network interface for receiving incoming data packets (202) from a network. The NIC (120) further includes logic for processing data packets and transferring data packets into system memory for use by applications in the system. The specific method by which data packets are transferred generally depends on the NIC hardware, the system's underlying architecture, which operating system is running on the system, and/or other similar factors.

Figure 2:
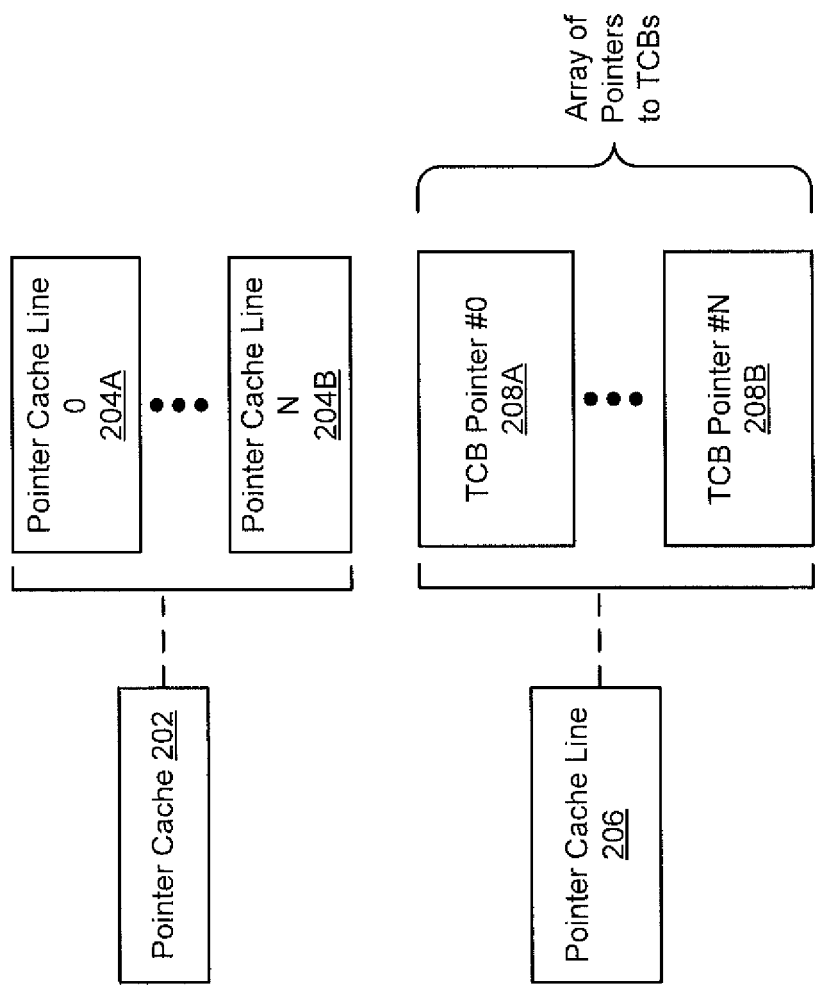
FIG. 2 shows a schematic diagram in accordance with one or more embodiments of the invention.

FIG. 2 shows a relational depiction of the pointer cache in accordance with one or more embodiments of the invention. In one or more embodiments of the invention, the pointer cache (202) is made up of a plurality of pointer cache lines (pointer cache line 0 (204A) to pointer cache line N (204B)). Each pointer cache line is an array of pointer cache elements. In one or more embodiments of the invention, each pointer cache line (204A, 204B) fits into a corresponding on-chip CPU cache line and is aligned on the CPU cache boundary, making each pointer cache line (206) an array of TCB pointers (TCB Pointer #0 (208A) to TCB Pointer #N (208B)). By aligning each pointer cache line (206) array on the CPU cache line boundary, embodiments of the invention may leverage the CPU pre-fetching capability to populate the pointer cache in fewer clock cycles. In one or more embodiments of the invention, the size of each pointer cache line is dependent on the CPU cache line size and the size of each TCB pointer that needs to be cached in each array element. In one or more embodiments of the invention, a pointer cache line size of each pointer cache line in the pointer cache may be determined using the formula (1) as follows:

Pointer Cache Line Size=
(CPU Cache Line Size/Size of a TCB pointer)    (1)

For example, on an architecture with a 128 Byte CPU cache line size and an 8 Byte TCB pointer, the pointer cache line size may be calculated using the above referenced formula as 128/8, which equals 16 Bytes. Further, the number of pointer cache lines in a pointer cache may depend on the number of TCBs stored in main memory. In addition, in one or more embodiments of the invention, a pointer cache line may grow dynamically based on the CPU cache line size.

Figure 3:
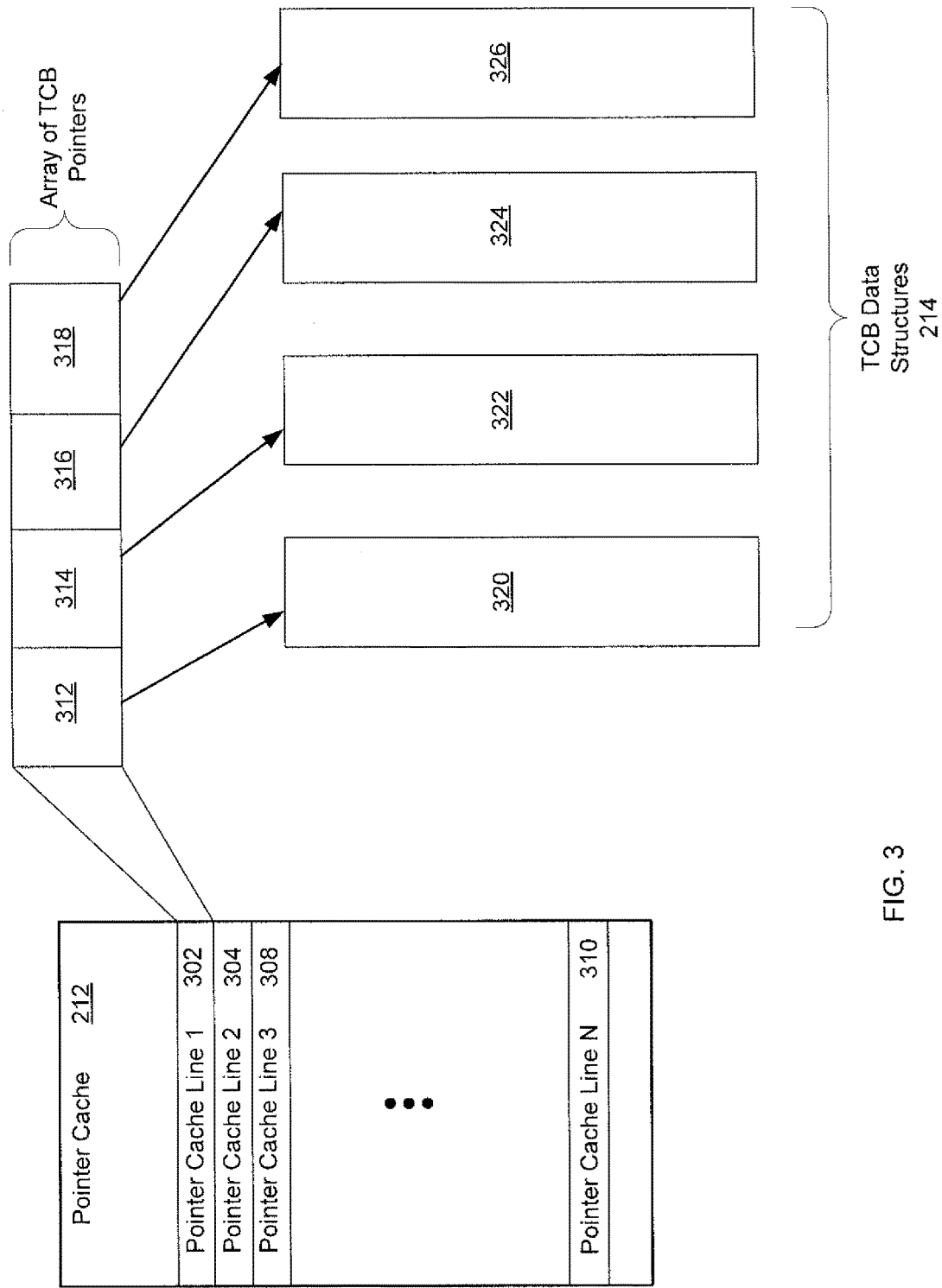
FIG. 3 shows a pointer cache in accordance with one or more embodiments of the invention.

FIG. 3 shows a pointer cache (212) in further detail in accordance with one or more embodiments of the invention. The pointer cache (212) includes a plurality of pointer cache lines 1-N (302, 304, 308, 310). As described above, a size of each pointer cache line (302, 304, 308, 310) is a function of the CPU cache line size (not shown) and a TCB pointer size. Further, each pointer cache line (302, 304, 308, 310) is an array of elements (312, 314, 316, 318) which are TCB pointers. Each TCB pointer (312, 314, 316, 318) references or points to a TCB data structure (214) in main memory. Thus, for example, array element 312 of pointer cache line (302) references TCB data structure 320. More specifically, each array element (312, 314, 316, 318) of the pointer cache line (302) stores a memory address that is the address of an information node of a TCB data structure. Thus, for example, array element 312 stores the memory address of the start of TCB data structure 320. Similarly, array element 314 stores the memory address of the start of TCB data structure 322, array element 316 stores the memory address of the start of TCB data structure 324, and array element 318 stores the memory address of the start of TCB data structure 326. In one or more embodiments of the invention, the pointer cache array elements (312, 314, 316, 318) occupy a contiguous block of memory. Further, in one or more embodiments of the invention, each pointer cache line of the pointer cache is aligned with the boundary of the CPU cache, which allows for the hardware to pre-fetch array elements into the CPU cache that are adjacent to a currently accessed pointer cache array element in the pointer cache. The concept of prefetching pointer cache elements into the CPU cache is explained in further detail with reference to FIG. 6.

In one or more embodiments of the invention, each global TCB data structure (214) may be implemented as any dynamically growing data structure such as a linked list, a hash table, a binary tree, an AVL tree, a Red-Black tree, or any other suitable data structure. Accordingly, depending on the type of data structure used to implement the TCBs in main memory, the pointer cache array element of the pointer cache line may reference a node of a binary tree, a hash bucket, a link list element, etc. Moreover, depending on the type of data structure used to implement the global TCBs, there may be more than one pointer cache for different subsets of the global TCB data structures. As described above, the pointer cache (212) stores a subset of the total possible number of TCB pointers. In one or more embodiments of the invention, the number of TCB pointers that are stored in the pointer cache (212) is a percentage of the maximum depth of the TCB data structure. For example, if the TCB data structure is implemented as a hash table with conflicts resolved by linked lists, the pointer cache may store, for example, 10% of the maximum length of the collision linked list.

Further, the location of the pointer cache may also depend on the type of data structure used to implement the TCBs. In one or more embodiments of the invention, the pointer cache is stored as a global array outside of the TCB data structures, but within main memory. More specifically, the pointer cache may be associated with the data structure implementation of the TCBs. For example, for TCBs implemented as hash tables, the pointer cache may be located as a part of each hash bucket. In this case, there may be a plurality of pointer caches, i.e., one pointer cache array for each hash bucket. In another example where the TCBs are implemented as a binary tree with ten nodes, there may be a single pointer cache array of five elements, each array element pointing to the most recently accessed nodes in the tree.

Figure 4:
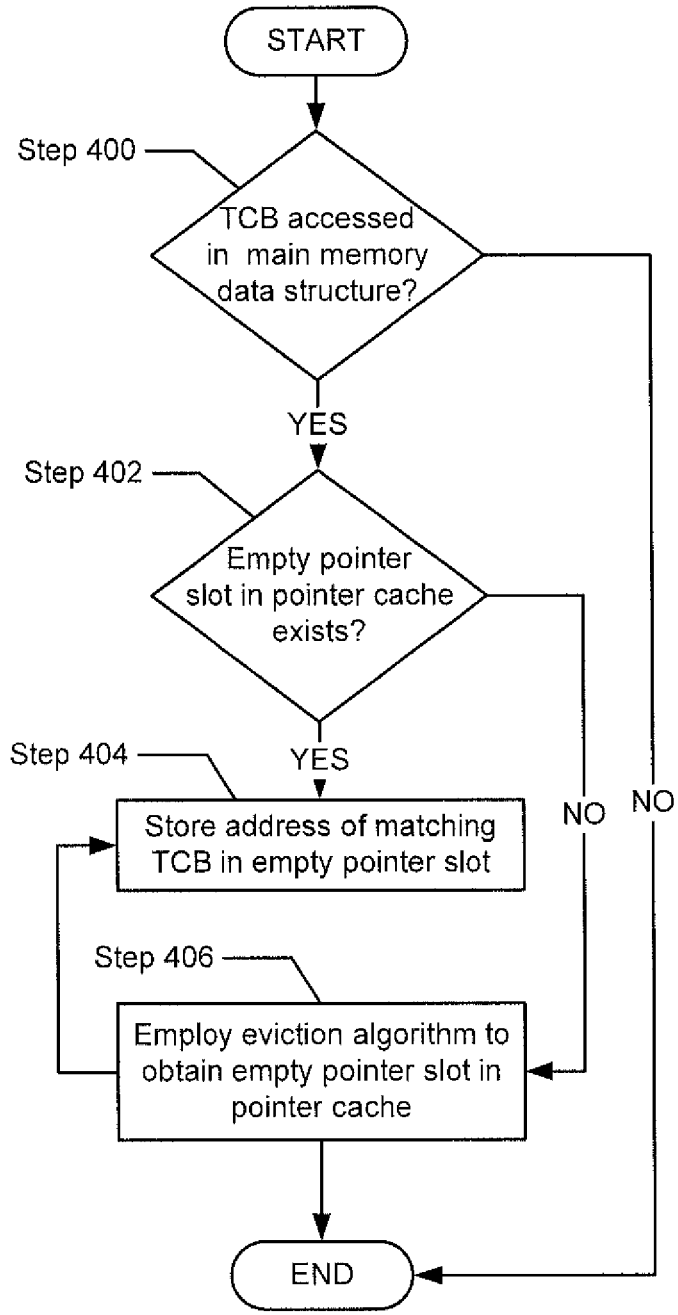
FIGS. 4-5 show flowcharts in accordance with one or more embodiments of the invention.
Figure 5:
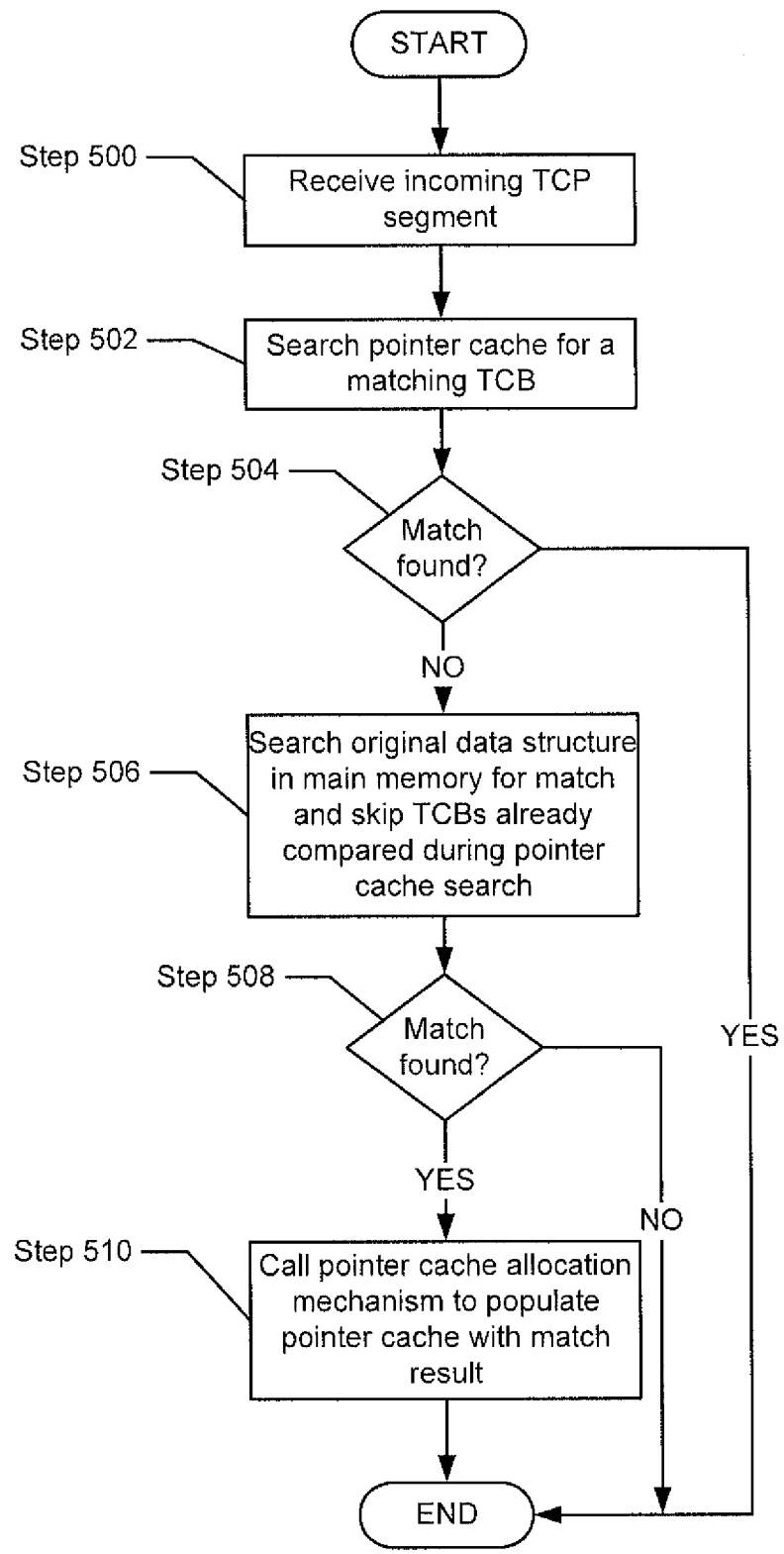

FIGS. 4-5 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. By way of an example, determination steps may be performed by performing a test, such as checking a data value to test whether the value is consistent with the tested condition in accordance with one or more embodiments of the invention.

FIG. 4 shows a flowchart for pointer cache allocation in accordance with one or more embodiments of the invention. The method described in FIG. 4 is used to allocate a pointer in the pointer cache when a TCB is access in the data structure stored in main memory. Initially, a determination is made as to whether a global TCB data structure is accessed in memory (ST 400). In one or more embodiments of the invention, a TCB may be accessed when the transport layer receives an incoming TCP segment which has to be matched with state information stored in the TCB. If no global TCB is accessed, the process ends. When a global TCB is accessed, a second determination is made as to whether there exists an empty pointer slot in the pointer cache (ST 402). If an empty pointer slot exists, then the memory address of an information node of the recently accessed TCB is stored in the empty pointer slot (ST 404). However, if an empty pointer slot does not exist in the pointer cache, an eviction algorithm is employed to obtain an empty pointer slot in the pointer cache (ST 406). Those skilled in the art will appreciate that any known cache eviction algorithm may be employed in embodiments of the invention to obtain an empty pointer slot. For example, a least-recently used (LRU) algorithm may be employed to evict a slot in the pointer cache. Further, those skilled in the art will appreciate that the process described in FIG. 4 may be repeated for each TCB access that is made as each incoming TCB segment is matched to the corresponding state information in a TCB.

FIG. 5 shows a flowchart for performing a look-up operation using the pointer cache in accordance with one or more embodiments of the invention. While the discussion of FIG. 5 focuses on a TCP protocol implemented in the transport layer, those skilled in the art will appreciate that the following process is applicable to any transport protocol. Initially, an incoming TCP segment (or data packet) is received by the transport layer (ST 500). At this stage, the pointer cache is used to search the most recently accessed TCBs pointed to by the pointer cache array elements to find a match of the four-tuple that is identified by the TCP segment (ST 502). That is, the subset of TCBs referenced by the pointer cache are searched first in order to determine whether any of those TCBs contain the matching four-tuple to the TCP segment. When a matching TCB is found (ST 504) by a TCB pointed to by the pointer cache, the process ends. However, if none of the most recently accessed TCB pointers include the matching four-tuple to the TCP segment, the TCB data structure search algorithm is called to locate the TCB containing the matching four-tuple (ST 506). That is, the general TCB look-up/search is performed to locate the TCB in main memory which stores the matching four-tuple to the incoming TCP segment, and the TCBs already compared during the pointer cache search in ST502 are skipped. Thus, in ST 506, the number of TCBs that need to be searched when a pointer cache miss occurs is reduced, as those already searched during the pointer cache search algorithm are omitted from the look up.

When a match is found in ST 508, the pointer cache allocation algorithm described in FIG. 4 is called to store the memory address of the TCB including the matching four-tuple in the pointer cache as one of the array elements (ST 510). In this manner, the pointer cache is populated with the memory address of the most recently accessed TCB having a matching four-tuple for an incoming TCP segment. Those of ordinary skill in the art will appreciate that if no match is found in the main data structures storing the state information for an incoming TCP segment, the search operation fails and an error is returned (not shown).

Those skilled in the art will appreciate that the pointer cache reduces the number of TCBs that must be searched before a matching four-tuple is found for an incoming TCP segment. That is, while main memory may still be accessed to obtain the corresponding state information and the four-tuple match, the number of TCB look ups that must be performed before the correct access to main memory is made is dramatically reduced by first searching the pointer cache array. In addition, by skipping the TCBs present in the pointer cache array during the main memory TCB data structure search, the number of memory accesses is reduced.

In one or more embodiments of the invention, when a TCB is deleted from main memory, a deallocation algorithm is employed to empty the corresponding slot in the pointer cache. The deallocation algorithm may replace the memory address of the deleted TCB with a null address in the pointer cache. The TCB node is then freed by a main memory deallocated algorithm or delete operation.

Figure 6:
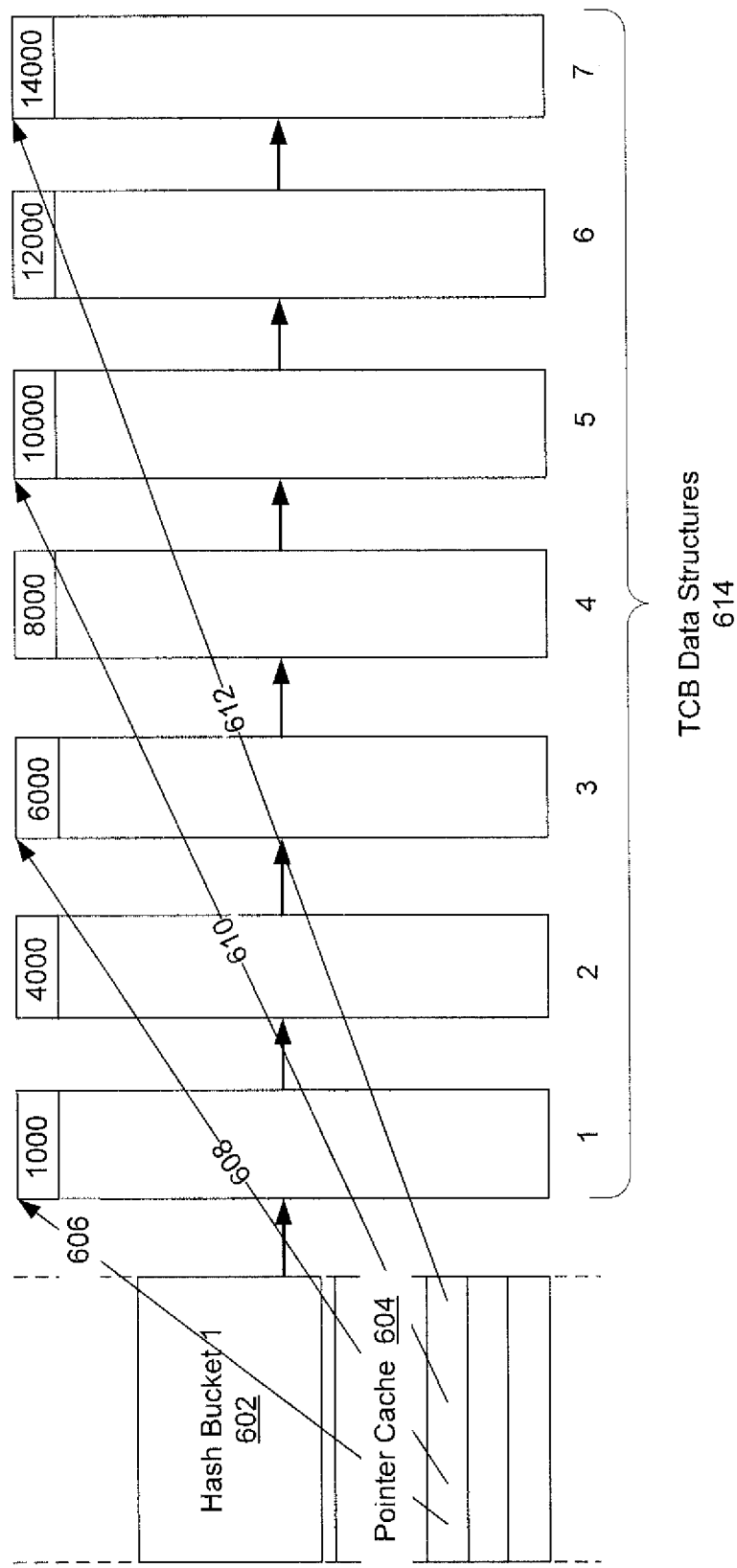
FIG. 6 shows an example in accordance with one or more embodiments of the invention.

FIG. 6 shows an example pointer cache in accordance with one or more embodiments of the invention. In the example of FIG. 6, the TCB data structures (614) are implemented using a hash table that uses linked lists for collision resolution. In this scenario, the pointer cache (604) is located within one of the hash buckets (Hash Bucket 1 (602)). Those skilled in the art will appreciate that in such an implementation, each hash bucket would have its own associated pointer cache.

Turning to the specific example illustrated by FIG. 6, consider that at a certain instance, there are several TCBs in the connection table shown in FIG. 6, labeled TCB 1 to 7. The pointer cache (604) has a single cache line for four pointers (606, 608, 610, 612) pointing to a memory address of a TCB data structure (614). Thus, the first pointer cache line of the pointer cache (604) includes four array elements of pointers (606, 608, 610, 612) referencing TCB 1 at memory address 1000, TCB 3 at memory address 6000, TCB 5 at memory address 10000, and TCB 7 at memory address 14000. In other words, at the instance shown in FIG. 6, the pointer cache allocation algorithm has cached TCB 1, TCB 3, TCB5, and TCB 7, because these are the most recently accessed TCBs by the main memory search/look-up algorithm to find a matching four-tuple for incoming TCP segments.

In one or more embodiments of the invention, the array elements of the pointer cache line are located at contiguous memory locations. Thus, for example, with an array element being 8 Bytes, pointer cache element 1 (606) which stores the memory address 1000 may be at address 0 in memory, pointer cache element 2 (608) which stores the memory address 6000 may be at address 8 in memory, pointer cache element 3 (610) which stores the memory address 10000 may be at address 16 in memory, and pointer cache element 4 (612) which stores the memory address 14000 may be at address 24 in memory.

Continuing with the example of FIG. 6, consider the look up for TCB 7 using the pointer cache (604). The lookup/search operation calls the pointer cache look up algorithm, which accesses continuous memory locations 0, 8, 16, and 24 consecutively. TCB 7 is found on the fourth lookup using the pointer cache (604), instead of the seven look-ups (i.e., one for each TCB stored in main memory) that would need to occur without the pointer cache storing the most recently accessed TCBs as part of the data structure implementation chosen for the TCBs.

In one or more embodiments of the invention, when 0 is read from memory, the CPU prefetches 8, 16, and 24 into the CPU cache to take advantage of spatial locality. Accordingly, the memory access penalty is paid only for accessing memory location 0, and the remaining 3 accesses for 8, 16, and 24 are from CPU cache memory which is several times faster than main memory access. Accordingly, in the example of FIG. 6, when array element 606 is accessed because of a packet arrival on TCB at 1000, the hardware data prefetching feature implemented by most CPUs automatically prefetches three other elements located after array element 606 into the CPU cache (e.g., the on-chip L1 or L2 cache). Accordingly, having the pointer cache array elements be in contiguous blocks of memory and aligning the pointer cache line with the boundary of the CPU cache line allows the hardware to automatically prefetch memory addresses pointed to by 608, 610, and 612 into the CPU cache. When TCB 3, 5, or 7 receives a packet, TCB traversal in search of a four-tuple match occurs in the CPU cache, instead of accessing main memory, resulting in less latency for processing the packet.

Figure 7:
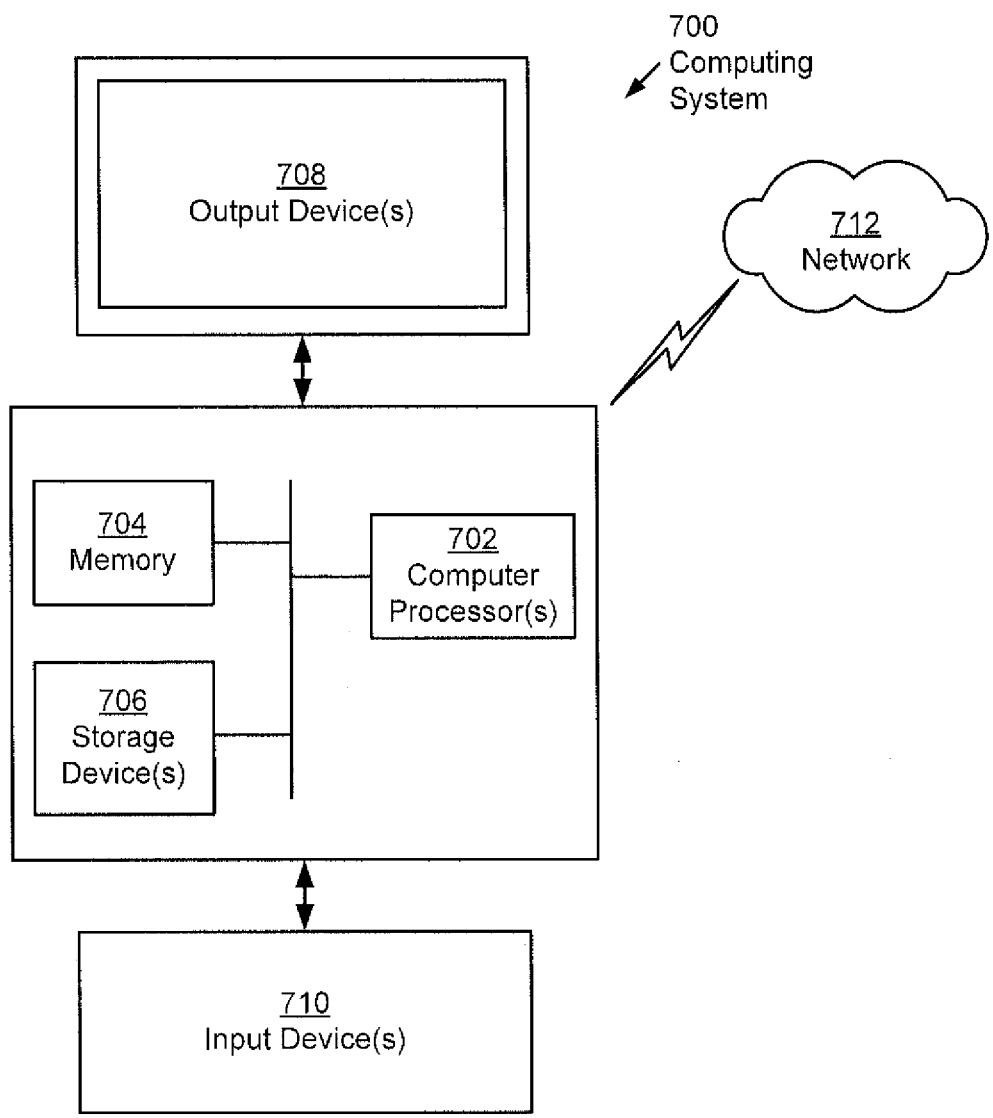
FIG. 7 shows a computer system in accordance with one or more embodiments of the invention.

Embodiments of the invention may be implemented on virtually any type of computing system regardless of the platform being used. For example, the computing system (700) may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. Specifically, the host of FIG. 1 may be implemented as one or more of the computing systems (700) described above. As shown in FIG. 7, the computing system (700) may include one or more computer processor(s) (702), associated memory (704) (e.g., random access memory (RAM), cache memory, flash memory, etc.), one or more storage device(s) (706) (e.g., a hard disk, an optical drive such as a compact disk (CD) drive or digital versatile disk (DVD) drive, a flash memory stick, etc.), and numerous other elements and functionalities. The computer processor(s) (702) may be an integrated circuit for processing instructions. For example, the computer processor(s) may be one or more cores, or micro-cores of a processor. The computing system (700) may also include one or more input device(s) (710), such as a touchscreen, keyboard, mouse, microphone, touchpad, electronic pen, or any other type of input device. Further, the computing system (700) may include one or more output device(s) (708), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (700) may be connected to a network (712) (e.g., a local area network (LAN), a wide area network (WAN) such as the Internet, mobile network, or any other type of network) via a network interface connection (not shown). The input and output device(s) may be locally or remotely (e.g., via the network (712)) connected to the computer processor(s) (702), memory (704), and storage device(s) (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (700) may be located at a remote location and connected to the other elements over a network (712). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Embodiments of the invention provide a data structure and associated management routines for more efficient transport layer lookups in network stacks. In particular, embodiments of the invention reduce look-up complexity for network flow look-up operations by reducing the number of look-up/search operations that need to be performed to find the matching four-tuple for each transport layer connection. Further, because the dynamic data structures in main memory contain information nodes that are sparsely distributed in memory, traversal of the pointer cache avoids accesses to scattered memory locations, thereby reducing the number of cache misses and expensive main memory accesses.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for transport layer lookup, comprising:
receiving, by a transport layer of a network protocol stack, a first incoming transport layer packet;
searching a pointer cache for a first matching transport layer data structure comprising state information corresponding to the first incoming packet, wherein the pointer cache comprises:
a plurality of pointer cache lines, each of which is configured to store at least one pointer to a subset of a plurality of global transport layer data structures in main memory, and a pointer cache line size, wherein each of the plurality of pointer cache lines comprises a plurality of array elements, each of which stores a pointer to a memory address for a recently accessed transport layer data structure, wherein each of the plurality of pointer cache lines is aligned with a boundary of a central processing unit (CPU) cache line of a plurality of CPU cache lines of a CPU cache, wherein the pointer cache line size is a function of a size of the CPU cache line and a transport control protocol control block (TCB) pointer size;
prefetching a plurality of array elements of a pointer cache line of the plurality of pointer cache lines into the CPU cache line, wherein the plurality of array elements comprises a pointer to the first matching transport layer data structure;
returning the state information corresponding to the first incoming packet using the first matching transport layer data structure when a pointer cache hit occurs for the state information corresponding to the first incoming packet; receiving, by the transport layer of a network protocol stack, a second incoming transport layer packet;
searching the pointer cache for a second matching transport layer data structure comprising state information corresponding to the second incoming packet;
and in response to a pointer cache miss when searching for the second matching transport layer data structure:
searching the plurality of global transport layer data structures in main memory to obtain the second matching transport layer data structure, and storing a pointer to a memory address of the second matching transport layer data structure in the pointer cache.

2. The method of claim 1, wherein when the pointer cache hit occurs for the state information corresponding to the first incoming packet, only the subset of TCBs referenced by the pointer cache is searched.

3. The method of claim 1, wherein the transport layer data structure is a TCP control block (TCB) implemented as one selected from a group consisting of a hash table, a binary tree, a Red-Black tree, an AVL tree, and a linked list.

4. The method of claim 1, wherein each pointer cache line of the pointer cache stores a pointer to a memory address of the subset of plurality of global transport layer data structures.

5. The method of claim 2, further comprising: populating the pointer cache by storing a memory address of a recently accessed TCB in an array element of one of the plurality of pointer cache lines.

6. The method of claim 1, further comprising: evicting at least one pointer cache array element of the plurality of array elements of at least one pointer cache line when the pointer cache is full and a pointer cache miss occurs.

7. A host, comprising:
a central processing unit (CPU) and an associated CPU cache, wherein the associated CPU cache comprises a plurality of CPU cache lines; a network protocol stack comprising a transport layer configured to receive a first incoming packet and a second incoming packet; and main memory configured to store:
a plurality of global transport layer data structures, wherein the plurality of global transport layer data structures is configured to store state information for a plurality of incoming packets, and
a pointer cache comprising a plurality of pointer cache lines, each of which is configured to store at least one pointer to a subset of the plurality of global transport layer data structures, and a pointer cache line size, wherein each of the plurality of pointer cache lines comprises a plurality of array elements, each of which stores a pointer to a memory address for a recently accessed transport layer data structure,
wherein each of the plurality of pointer cache lines is aligned with a boundary of a central processing unit (CPU) cache line of the plurality of CPU cache lines, wherein the pointer cache line size is a function of a size of the CPU cache line and a transport control protocol control block (TCB) pointer size, wherein the transport layer is further configured to:
search the pointer cache for a first matching transport layer data structure comprising state information corresponding to the first incoming packet;
prefetch a plurality of array elements of a pointer cache line of the plurality of pointer cache lines into the CPU cache line, wherein the plurality of array elements comprises a pointer to the first matching transport layer data structure;
return the state information corresponding to the first incoming packet using the first matching transport layer data structure when a pointer cache hit occurs for the state information corresponding to the first incoming packet;
search the pointer cache for a second matching transport layer data structure comprising state information corresponding to the second incoming packet; and
in response to a pointer cache miss when searching for the second matching transport layer data structure:
search the plurality of global transport layer data structures in the main memory to obtain the second matching transport layer data structure, and store a pointer to a memory address of the second matching transport layer data structure in the pointer cache.

8. The host of claim 7, wherein when the pointer cache hit occurs for the state information corresponding to the first incoming packet, only the subset of TCBs referenced by the pointer cache is searched.

9. The host of claim 7, wherein the transport layer data structure is a TCP control block (TCB) implemented as one selected from a group consisting of a hash table, a binary tree, a Red-Black tree, an AVL tree, and a linked list.

10. A non-transitory computer readable medium comprising software instructions that when executed, perform a method for transport layer lookup, comprising:
receiving, by a transport layer of a network protocol stack, a first incoming transport layer packet;
searching a pointer cache for a first matching transport layer data structure comprising state information corresponding to the first incoming packet, wherein the pointer cache comprises:
a plurality of pointer cache lines, each of which is configured to store at least one pointer to a memory address of a subset of a plurality of global transport layer data structures in main memory, and a pointer cache line size, wherein each of the plurality of pointer cache lines comprises a plurality of array elements, each of which stores a pointer to a memory address for a recently accessed transport layer data structure, wherein each of the plurality of pointer cache lines is aligned with a boundary of a central processing unit (CPU) cache line of a plurality of CPU cache lines of a CPU cache, wherein the pointer cache line size is a function of a size of the CPU cache line and a transport control protocol control block (TCB) pointer size;
prefetching a plurality of array elements of a pointer cache line of the plurality of pointer cache lines into the CPU cache line, wherein the plurality of array elements comprises a pointer to the first matching transport layer data structure; returning the state information corresponding to the first incoming packet using the first matching transport layer data structure when a pointer cache hit occurs for the state information corresponding to the first incoming packet; receiving, by the transport layer of a network protocol stack, a second incoming transport layer packet;
searching the pointer cache for a second matching transport layer data structure comprising state information corresponding to the second incoming packet; and
in response to a pointer cache miss when searching for the second matching transport layer data structure:
searching the plurality of global transport layer data structures in main memory to obtain the second matching transport layer data structure, and storing a pointer to the memory address of the second matching transport layer data structure in the pointer cache.

* * * * *